United States Patent
Sasaki et al.

(10) Patent No.: US 10,247,304 B2
(45) Date of Patent: Apr. 2, 2019

(54) CONTROL DEVICE FOR CONTINUOUSLY VARIABLE TRANSMISSION FOR USE IN VEHICLES

(71) Applicants: JATCO Ltd, Fuji-shi, Shizuoka (JP); NISSAN MOTOR CO., LTD., Yokohama-shi, Kanagawa (JP)

(72) Inventors: Kiyofumi Sasaki, Fuji (JP); Youji Itou, Sagamihara (JP); Kosuke Abe, Isehara (JP)

(73) Assignees: JATCO LTD, Fuji-shi (JP); NISSAN MOTOR CO., LTD., Yokohama-shi (JP)

( * ) Notice: Subject to any disclaimer, the term of this patent is extended or adjusted under 35 U.S.C. 154(b) by 106 days.

(21) Appl. No.: 15/121,453

(22) PCT Filed: Feb. 17, 2015

(86) PCT No.: PCT/JP2015/054201
§ 371 (c)(1),
(2) Date: Aug. 25, 2016

(87) PCT Pub. No.: WO2015/133258
PCT Pub. Date: Sep. 11, 2015

(65) Prior Publication Data
US 2016/0363219 A1  Dec. 15, 2016

(30) Foreign Application Priority Data

Mar. 3, 2014 (JP) .................................. 2014-040830

(51) Int. Cl.
*F16H 59/66* (2006.01)
*F16H 61/662* (2006.01)
(Continued)

(52) U.S. Cl.
CPC ......... *F16H 61/66272* (2013.01); *F16H 9/18* (2013.01); *F16H 59/66* (2013.01);
(Continued)

(58) Field of Classification Search
CPC ........................ B60W 2550/147; F16H 59/66
See application file for complete search history.

(56) References Cited

U.S. PATENT DOCUMENTS 5,337,628 A   8/1994  Hendriks et al.
5,983,154 A  11/1999  Morisawa
(Continued)

FOREIGN PATENT DOCUMENTS

EP   1 403 560 A2   3/2004
EP   2 050 986 A1   4/2009
(Continued)

OTHER PUBLICATIONS

U.S. Appl. No. 15/121,450, filed Aug. 25, 2016, JATCO Ltd and Nissan Motor Co., Ltd.
(Continued)

*Primary Examiner* — Tisha D Lewis
(74) *Attorney, Agent, or Firm* — Foley & Lardner LLP (57) ABSTRACT

A control device for a continuously variable transmission of a vehicle includes a shift control section being configured to perform a rough road corresponding control to increase the hydraulic pressure to a value larger than the hydraulic pressure at a smooth road judgment at which the smooth road is judged, at a rough road judgment at which the rough road is judged, and when a line-pressure-up control condition is satisfied at the rough road judgment, the line pressure control section being configured to increase the line pressure to be greater than the line pressure when the line-pressure-up control condition is not satisfied.

11 Claims, 6 Drawing Sheets

(51) Int. Cl.
*F16H 61/00* (2006.01)
*F16H 9/18* (2006.01)
*F16H 59/72* (2006.01)

(52) U.S. Cl.
CPC ......... *F16H 59/72* (2013.01); *F16H 61/0021* (2013.01); *F16H 61/66259* (2013.01); *F16H 2061/66277* (2013.01)

(56) References Cited

U.S. PATENT DOCUMENTS

| | | | |
|---|---|---|---|
| 6,029,107 A | 2/2000 | Sato | |
| 7,192,383 B2 * | 3/2007 | Shimada | B60W 10/06 477/110 |
| 2006/0136111 A1 * | 6/2006 | Robert | F16H 59/66 701/65 |
| 2007/0232443 A1 * | 10/2007 | Kimura | F16H 61/66259 477/48 |
| 2009/0043468 A1 * | 2/2009 | Kondo | B60W 10/06 701/61 |
| 2010/0241322 A1 * | 9/2010 | Miyanoo | F16H 61/6672 701/54 |
| 2012/0302400 A1 | 11/2012 | Wakayama et al. | |

FOREIGN PATENT DOCUMENTS

| | | | |
|---|---|---|---|
| JP | 2003-269591 A | 9/2003 | |
| JP | 4039180 B2 * | 1/2008 | B65D 53/02 |

OTHER PUBLICATIONS

Notice of Allowance on U.S. Appl. No. 15/121,450 dated Jul. 13, 2018.

* cited by examiner

CONTROL DEVICE FOR CONTINUOUSLY VARIABLE TRANSMISSION FOR USE IN VEHICLES

TECHNICAL FIELD

This invention relates to a control device for a continuously variable transmission for a vehicle configured to control a clamping force by a pulley with respect to a circular belt member such as a belt and a chain in accordance with a road surface state.

BACKGROUND ART

In the continuously variable transmission using a circular belt member (hereinafter, referred to as a belt) such as a belt and a chain, a hydraulic pressure is supplied to a primary pulley and a secondary pulley. A clamping force is added to the belt by this hydraulic pressure. A torque is transmitted by using a frictional force generated by the clamping force. In this continuously variable transmission, the torque is inputted from the engine. The torque is also inputted from the driving wheels in accordance with the state of a road surface. For example, the torque inputted from this driving wheel is increased at the traveling on the rough road such as a dirt. Accordingly, the frictional force is deficient with respect to the transmission torque (transmitting torque). The slippage between the pulley and the belt may be generated.

As a countermeasure for the above problem, a patent document 1 proposes an art in which when it is judged that the road surface state is a rough road, the clamping force is increased relative to a case where it is judged that the road surface state is a smooth road, so as to prevent a slippage of the belt. In particular, the hydraulic pressure of the hydraulic fluid supplied to a hydraulic pressure actuator of the driven pulley (the secondary pulley) is adjusted so as to obtain the desired clamping force. Moreover, the hydraulic pressure supplied to a hydraulic pressure actuator of the driving pulley (the primary pulley) is adjusted so as to attain the desired transmission gear ratio.

However, for increasing the clamping force of the secondary pulley when it is judged that the road surface state is the rough road like the art of the patent document 1, it is necessary to increase the hydraulic pressure of the hydraulic fluid supplied to the hydraulic actuator of the secondary pulley.

Moreover, in case of a vehicle (automobile), in general, the hydraulic pressure is produced by a mechanical oil pump driven by an engine for the traveling. The hydraulic fluid discharged from the oil pump driven by the engine is used as the hydraulic fluid supplied to the hydraulic pressure actuator of the pulleys of the continuously variable transmission for the vehicle.

PRIOR ART DOCUMENT

Patent Document

Patent Document 1: Japanese Patent Application Publication No. 2003-269591

SUMMARY OF THE INVENTION

The present inventors tested in the continuously variable transmission for the vehicle which is arranged to supply the hydraulic fluid to the hydraulic pressure actuators of the pulleys by using the oil pump driven by the engine as the hydraulic pressure source, by employing the art at the rough road judgment of the patent document 1. Consequently, it was understood that an oil vibration (hydraulic pressure vibration) is generated in a specific condition in which the temperature of the hydraulic fluid (the oil temperature) reaches a normal temperature and an accelerator opening degree of the vehicle is extremely small (at an extremely small opening degree). This oil vibration causes judder feeling so that the driving feeling and the riding feeling are deteriorated.

It is, therefore, an object of the present invention to provide a control device for a continuously variable transmission for a vehicle devised to solve the above-mentioned problems, and to suppress a generation of an oil vibration in the control device configured to increase a belt clamping force to prevent a slippage of a belt, when it is judged that a road surface state is a rough road.

(1) In the present invention, a control device for a continuously variable transmission of a vehicle, the continuously variable transmission including a primary pulley connected to an output shaft side of a power plant, a secondary pulley connected to a driving wheel side, an oil pump arranged to be driven by the power plant, and to supply a hydraulic fluid to the pulleys, and a circular belt member wound around the pulleys, the control device comprises: a shift control means configured to control a hydraulic pressure of the hydraulic fluid supplied to the pulleys in accordance with a traveling state of the vehicle, and thereby to control a transmission gear ratio of the continuously variable transmission; a line pressure control means configured to control a line pressure which is a base pressure of the hydraulic pressure; and a road surface judging means configured to judge whether a state of a road surface on which the vehicle travels is a smooth road or a rough road, when the road surface judging means judges the rough road, the shift control means being configured to perform a rough road corresponding control to increase the hydraulic pressure to a value larger than the hydraulic pressure when the road surface judging means judges the smooth road, and when a line-pressure-up control condition is satisfied at the rough road judgment, the line pressure control means being configured to increase the line pressure to be greater than the line pressure when the line-pressure-up control condition is not satisfied.

Besides, the circular belt member includes a belt and a chain.

(2) It is preferable that the line-pressure-up control condition includes a condition in which an input torque from the power plant to the primary pulley is equal to or greater than a predetermined torque.

(3) It is preferable that the line-pressure-up control condition includes a condition in which a rotation speed of the primary pulley is equal to or smaller than a predetermined rotation speed.

(4) It is preferable that the line-pressure-up control condition includes a condition in which an accelerator opening degree of the vehicle is equal to or smaller than a predetermined opening degree.

(5) It is preferable that the line-pressure-up control condition includes a condition in which a vehicle speed of the vehicle is equal to or smaller than a predetermined vehicle speed.

(6) It is preferable that the line-pressure-up control condition includes an oil temperature of the hydraulic fluid is equal to or greater than a predetermined temperature.

(7) It is preferable that the control device includes a rotation speed control means is configured to perform a rotation speed control so that the rotation speed of the primary pulley becomes equal to or greater than a set lower limit rotation speed when a rotation speed control condition is satisfied at the rough road judgment.

(8) It is preferable that the rotation speed control means is configured to control the transmission gear ratio when the rotation speed of the primary pulley is lower than the lower limit rotation speed when the rotation speed control condition is satisfied, and thereby to increase the rotation speed of the primary pulley, and the rotation speed control means is configured to control the transmission gear ratio when the rotation speed of the primary pulley reaches the lower limit rotation speed, and thereby to hold the rotation speed of the primary pulley so that the rotation speed of the primary pulley is equal to or greater than the lower limit rotation speed.

(9) It is preferable that the lower limit rotation speed is set based on the rotation speed by which the oil pump is capable of supplying the hydraulic pressure necessary for controlling the transmission gear ratio of the continuously variable transmission for the vehicle to a target transmission gear ratio.

(10) It is preferable that the lower limit rotation speed is set to a higher speed side as the temperature of the hydraulic fluid is higher.

(11) It is preferable that the shift control means is configured to perform, at the smooth road judgment, a smooth road corresponding control to control the hydraulic fluid supplied to the secondary pulley, to a corresponding hydraulic pressure according to an output torque from the power plant; the shift control means is configured to perform, at the rough road judgment, the rough road corresponding control to increase a clamping force by the secondary pulley to be greater than the corresponding hydraulic pressure; and the shift control means is configured to control the hydraulic pressure of the primary pulley to a balance pressure according to the hydraulic pressure of the secondary pulley at both of the smooth road corresponding control and the rough road corresponding control so that the transmission gear ratio of the continuously variable transmission of the vehicle becomes the target transmission gear ratio.

By the control device for the continuously variable transmission for the vehicle according to the present invention, the shift control means increases the hydraulic pressure of the hydraulic fluid supplied to the pulley at the rough road judgment, relative to the hydraulic pressure at the smooth road surface judgment. Accordingly, the frictional force between the pulleys and the circular belt member is increased. Consequently, even when the transmission torque between the pulleys and the circular belt member is increased by the increase of the torque inputted from the driving wheel when the vehicle travels on the rough road, it is possible to prevent the slippage between the pulleys and the circular belt member by the increase of the frictional forces between the pulleys and the circular belt member.

At the rough road judgment, the oil vibration may be generated. However, when the line-pressure-up control condition is satisfied at the rough road judgment, the line pressure is increased to be greater than a value at the non-satisfaction of the line-pressure-up control condition. Accordingly, it is possible to suppress the generation of the oil vibration.

BRIEF DESCRIPTION OF DRAWINGS

FIG. 2(*a*) is the view in a case where a temperature of a hydraulic fluid (oil temperature) is a control condition parameter. FIG. 2(*b*) is a view in a case where a vehicle speed and an accelerator opening degree are control condition parameters. FIG. 2(*c*) is a view in a case where a rotation speed of a primary pulley and an engine torque are control condition parameters.

DESCRIPTION OF EMBODIMENTS

Hereinafter, an embodiment according to the present invention is illustrated with reference to the drawings.

Figure 1:
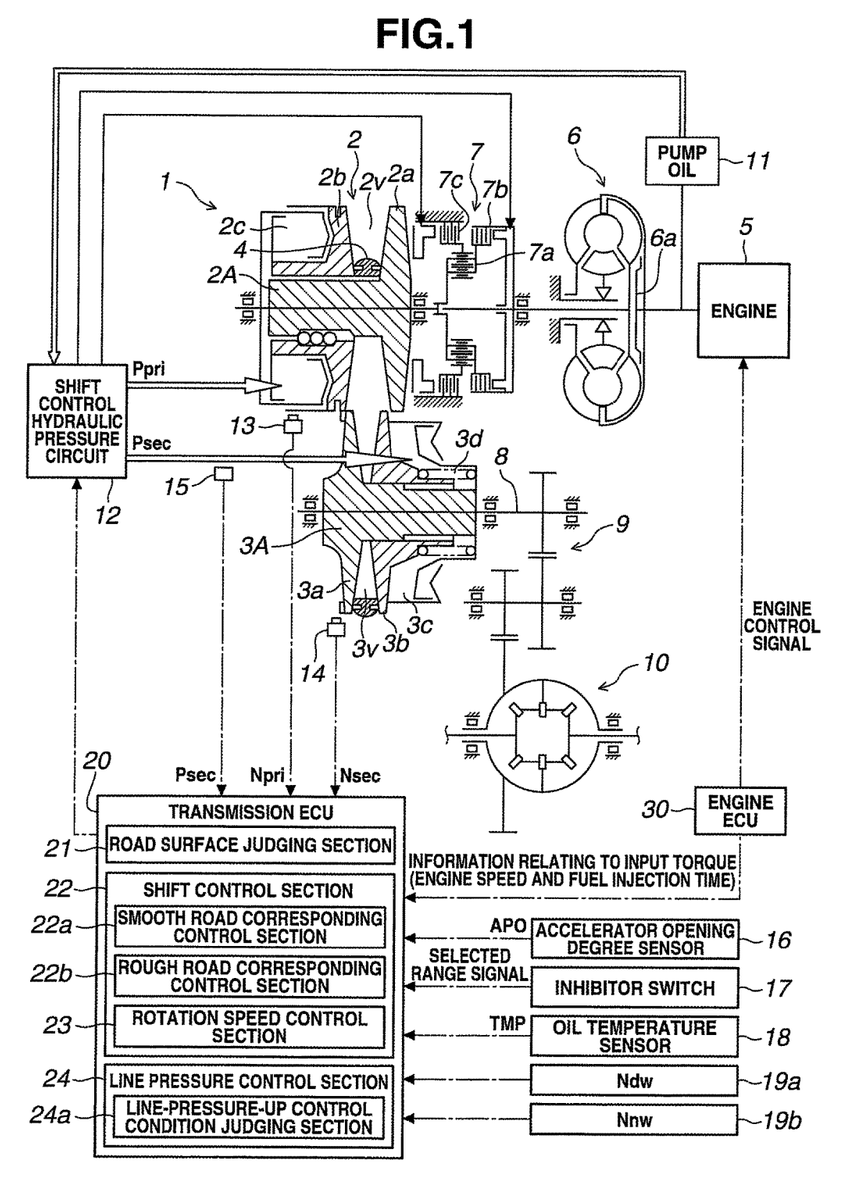
FIG. 1 is a configuration view showing a continuously variable transmission for a vehicle and a control device thereof according to one embodiment of the present invention.
Figure 2:
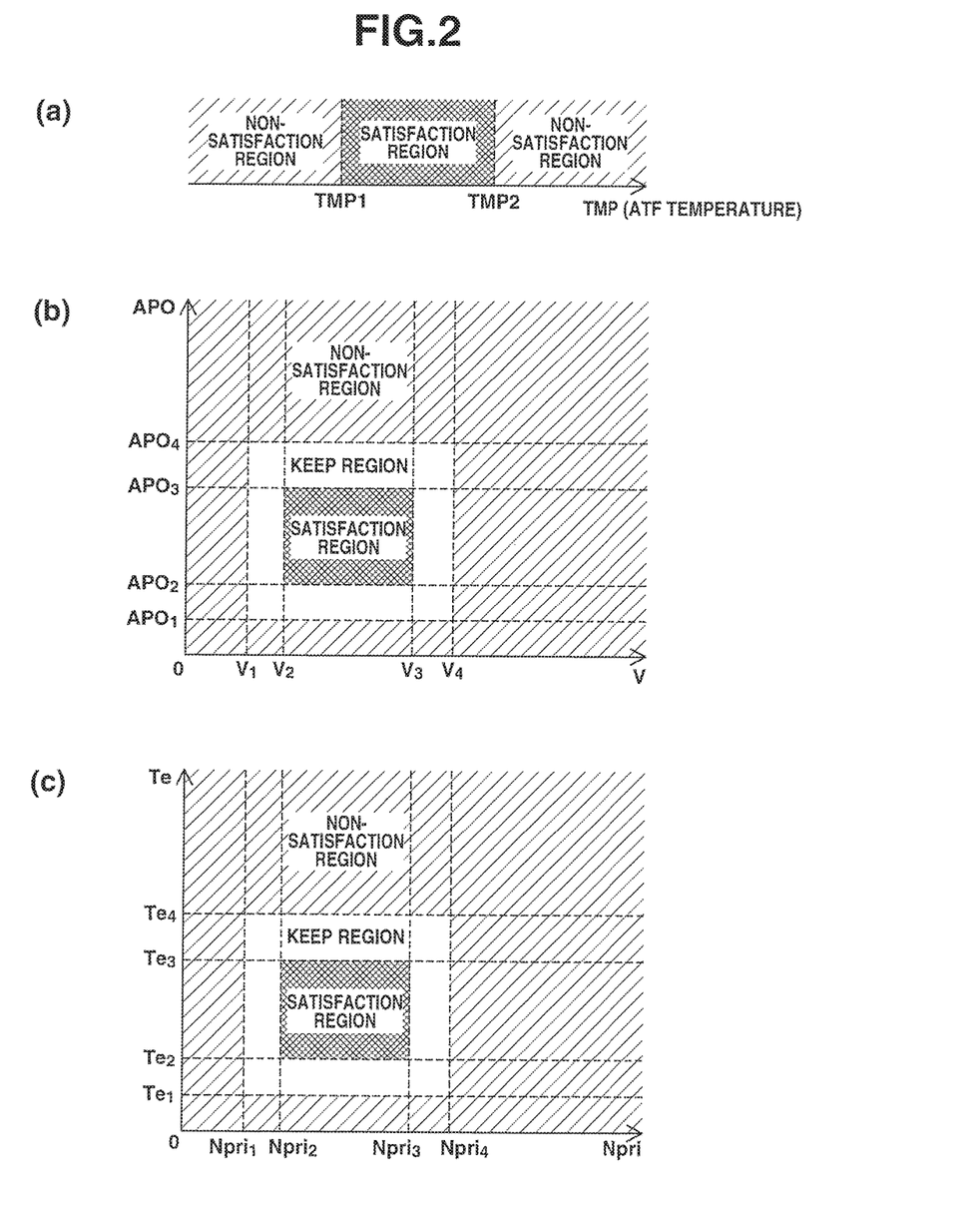
FIG. 2 are views for illustrating control conditions a line pressure control according to the one embodiment.
Figure 3:
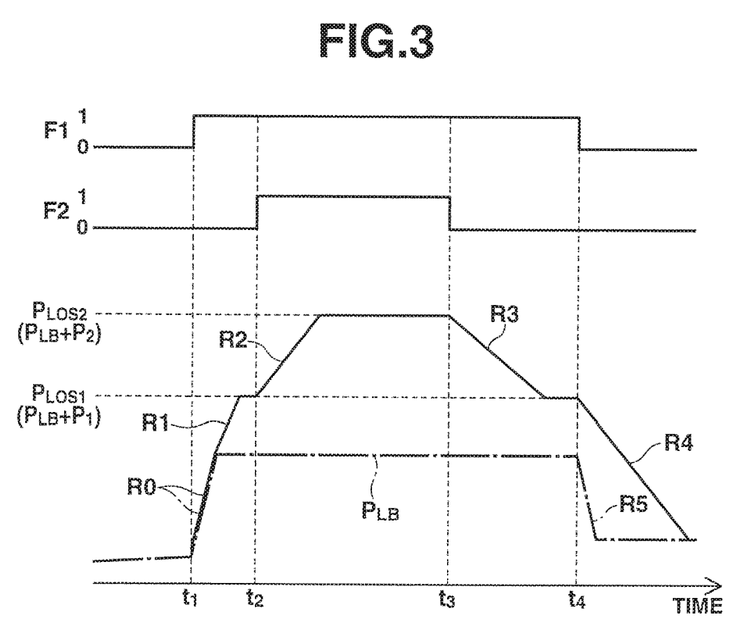
FIG. 3 is a time chart for illustrating a control example by a line pressure control according to the one embodiment of the present invention.

FIG. 1 is a configuration view showing a continuously variable transmission (stepless transmission) for a vehicle and a control device thereof according to this embodiment. FIG. 2 is a view for illustrating control conditions of a line pressure control of the control device. FIG. 3 is a time chart showing an example of a control by the line pressure control of the control device. FIG. 4 to FIG. 9 are flowcharts showing the respective controls. It is explained with reference to the drawings.

In this embodiment, it is judged whether a road surface is "a smooth road (good road)" or "a rough road (not-good road)". In this case, "the smooth road" corresponds to a paved road paved mainly by asphalt, concrete and so on. "The smooth road" includes an unpaved road on which a road surface grip force is stable at a constant value or more. "The rough road" is the unpaved road in general (that is, a dirt road), such as a gravel road, a macadam (macadamized) road, a foul road and so on, on which the road surface grip force is unstable.

[1. Structure]
[1-1. Continuously Variable Transmission for Vehicle]

First, the continuously variable transmission for the vehicle is explained. As shown in FIG. 1, the continuously variable transmission for the vehicle (CVT) 1 includes a primary pulley 2 and a secondary pulley 3 which have V-grooves 2*v* and 3*v* that are aligned with each other, and a V belt (circular belt member) 4 wound around the V grooves 2*v* and 3*v* of these pulleys 2 and 3. An engine (internal combustion engine) 5 which is a power plant is disposed coaxially with the primary pulley 2. A torque converter 6 with a lockup clutch 6c, and forward and rearward movement switching mechanism 7 are provided in this order from the side of the engine 5 between the engine 5 and the primary pulley 3.

The forward and rearward movement switching mechanism 7 includes, as a main constituting element, a double pinion planetary gear mechanism 7a. A sun gear of the double pinion planetary gear mechanism 7a is connected to the engine 5 through the torque converter 6. A carrier is connected to the primary pulley 2. Moreover, the forward and rearward movement switching mechanism 7 includes a forward clutch 7b configured to directly connect the sun gear and the carrier of the double pinion planetary gear mechanism 7a; and a rearward brake 7c configured to fix a ring gear.

At the engagement of the forward clutch 7b, a rotation inputted from the engine 4 through the torque converter 6 is directly transmitted to the primary pulley 2. At the engagement of the rearward brake 7c, the rotation inputted from the engine 5 through the torque converter 6 is reversed, and this reversed rotation is transmitted to the primary pulley 2.

The rotation of the primary pulley 2 is transmitted through the V belt 4 to the secondary pulley 3. In this transmission, the rotation is shifted by the transmission gear ratio according to the groove widths of the V grooves 2v and 3v of the primary pulley 2 and the secondary pulley 3. Moreover, the rotation of the secondary pulley 3 is transmitted through the output shaft 8, the gear mechanism 9, and a differential gear device 10 to driving wheels (not shown).

The primary pulley 2 includes a fixed pulley 2a fixed to a shaft 2A, and a movable pulley 2b which is configured to be moved in an axial direction of the shaft 2A, and to rotate as a unit with the shaft 2A, and which confronts the fixed pulley 2a. The secondary pulley 3 includes a fixed pulley 3a fixed to a shaft 3A, and a movable pulley 3b which is configured to be moved in an axial direction of the shaft 3A, and to rotate as a unit with the shaft 3A, and which confront the fixed pulley 3a. Confronting surfaces (sheave surfaces) of the fixed pulley 2a and the movable pulley 2b constitute the V groove 2v. Confronting surfaces (sheave surfaces) of the fixed pulley 3a and the movable pulley 3b constitute the V groove 3v. Groove widths of the V grooves 2v and 3v are varied in accordance with axial movements of the movable pulleys 2c and 3c with respect to the fixed pulley 2a and 3a.

The movable pulleys 2b and 3b are configured to be urged toward the fixed pulleys 2a and 3a by supplying a primary pulley pressure Ppri and a secondary pulley pressure Psec which are pressures of a hydraulic fluid produced from a line pressure PL which is a base pressure, to a primary pulley chamber 2c and a secondary pulley chamber 3c. With this, the sheave surfaces of the fixed pulley 2a and 3a and the movable pulley 2b and 3b sandwich and clamp side surfaces of the V belt 4 so as to transmit a power between the primary pulley 2 and the secondary pulley 3 by a frictional force transmission between the sheave surfaces.

[1.2. Control Device of Continuously Variable Transmission for Vehicle]

At the shift, this control device adjusts the primary pulley pressure Ppri and the secondary pulley pressure Psec to provide a difference between the clamping forces (thrust forces) of the both pulleys 2 and 3 with respect to the V belt 4. With this, the groove widths 2v and 3v of the both pulleys 2 and 3 are varied. Wounding arc diameters of the V belt 4 with respect to the pulleys 2 and 3 are continuously varied so as to attain a target transmission gear ratio. Besides, the secondary pulley 3 is provided with a spring 3d configured to generate the damping force. Accordingly, when the primary pulley pressure Ppri and the secondary pulley pressure Psec are not supplied, the groove width of the V groove 3v of the secondary pulley 3 is decreased, so that it becomes a lowest state.

There are provided an oil pump 11 and a shift control hydraulic pressure circuit 12, for supplying the hydraulic fluid (that is, ATF: Automatic Transmission Fluid) to hydraulic chambers of the primary pulley chamber 2c, the secondary pulley chamber 3c, the forward clutch 7b, and the rearward clutch 7c. The oil pump 11 is driven by the engine 5.

The shift control hydraulic pressure circuit 12 includes a regulator valve (not shown) configured to regulate the line pressure, a shift control valve (not shown) configured to regulate the primary pulley pressure Ppri, and a pressure decrease valve (not shown) configured to regulate the secondary pulley pressure Psec. The hydraulic pressure supplied from the oil pump 11 is controlled to the line pressure $P_L$ by the regulator valve. The shift control valve controls the line pressure $P_L$ which is the base pressure to the primary pulley pressure Ppri. The pressure decrease valve controls the line pressure $P_L$ which is the base pressure to the secondary pulley pressure Psec.

A transmission ECU [Electric Control Unit] 20 and an engine ECU 30 (described later) are LSI devices which are constituted by integrating microprocessor, ROM, RAM and so on. This transmission ECU 20 receives a signal from a primary pulley rotation sensor 13 configured to sense a rotation speed Npri of the primary pulley 2, a signal from a secondary pulley rotation sensor 14 configured to sense a rotation speed of Nsec of the secondary pulley 3, a signal from a secondary pulley pressure sensor 15 configured to sense the secondary pulley pressure Psec, a signal from an accelerator operation amount sensor 16 configured to sense an operation amount APO of an accelerator pedal, a selected range signal from an inhibitor switch 17 configured to sense a select lever position, a signal from an oil temperature sensor 18 configured to sense an oil temperature TMP of the hydraulic fluid of the CVT 1, a signal (an engine speed Ne, a fuel injection time period, and so on) relating to an engine input torque Te from the engine ECU 30 configured to control the engine 5, a signal from a driving wheel rotation sensor 19a configured to sense a rotation speed Ndw of the driving wheels, and a signal from a driven wheel rotation sensor 19b configured to sense a rotation speed Nnw of the driven wheels.

The transmission ECU 20 includes the following function elements. The transmission ECU 20 includes a road surface judging section (road surface judging means) configured to judge whether a road surface state of a road on which the vehicle travels is the smooth road or the rough road; a shift control section (shift control means) 22 configured to control the clamping force by the pulleys 2 and 3 by controlling the hydraulic pressures (the primary pulley pressure Ppri and the secondary pulley pressure Psec) of the hydraulic fluid supplied to the pulleys 2 and 3, and thereby to control the transmission gear ratio; a primary pulley rotation control section (rotation speed control means) 23 configured to control the rotation speed of the primary pulley 2; and a line pressure control section (line pressure control means) 24 configured to control the line pressure $P_L$ which is the base pressure of the hydraulic pressures.

The road surface judging section 21 is configured to whether the road surface state is "the smooth road" or "the rough road (dirt road)" based on the slippage state of the driving wheels. The road surface judging section 21 is also referred to as a dirt judging section since the dirt road is judged. In this embodiment, a deviation (=Ndw−Nnw) between the rotation speed Ndw of the driving wheel and the rotation speed Nnw of the driven wheel is compared with a judgment reference value ΔN previously set. When the deviation (=Ndw−Nnw) is smaller than the judgment reference value ΔN, it is judged that the road is "the smooth road" on which the slippage is not generated in the driving wheels. When the deviation (=Ndw−Nnw) is equal to or greater than the judgment reference value ΔN, it is judged that the road is "the rough road" on which the slippage is generated in the driving wheels.

On "the rough road" on which the road surface grip force is unstable, the road surface grip force are repeated to be decreased and retrieved (recovered). When the road surface grip force is decreased, the driving wheels are slipped. Then, when the grip force is retrieved, the slippage is dissolved while the driving wheels receive the reaction force toque from the road surface. In this way, when the driving wheels receive the reaction force torque from the road surface, this reaction force torque is inputted to the secondary pulley 3. This reaction force torque inputted from the road surface through the driving wheels is added to the secondary pulley 3, in addition to the input torque Te from the engine through the primary pulley 2 and the V belt 4, so as to induce the slippage between the secondary pulley 3 and the V belt 4.

That is, when the slippage is generated in the driving wheels, the slippage between the secondary pulley 3 and the V belt 4 may be generated thereafter. By focusing on the slippage of the driving wheel, it is possible to handle the generation of the slippage between the secondary pulley 3 and the V belt 4 before the generation or at the initial stage of the generation. In this judgment, it is preferable that the values of the rotation speed Ndw and the rotation speed of the driven wheel Nnw are processed by the low pass filter and so on, and the deviation is calculated, for preventing the error judgment due to the noise and so on of the data. Moreover, in this embodiment, when "the rough road" is judged once, this rough road judgment is held during a predetermined time period. With this, the generation of the slippage of the V belt 4 is more surely prevented.

Besides, the judgment of the road surface state is not limited to the method based on the rotation speed difference between the driving wheels and the driven wheels like this embodiment. For example, as described in the patent document 1, it is possible to employ a method of judging based on a high frequency wave component of the rotation speed of the output side of the transmission by the road surface input, and a method of judging based on whether or not there is a temporal large sudden torque from the driving wheels to the transmission. Moreover, it is possible to judge by combining various methods.

The shift control section 22 controls the clamping forces of the pulleys 2 and 3 by the control of the hydraulic pressures (the primary pulley pressure Ppri and the secondary pulley pressure Psec) of the hydraulic fluids supplied to the pulleys 2 and 3. This shift control section 22 includes a smooth road surface control section (smooth road corresponding control means) 22a configured to perform a normal shift control according to the smooth road in the normal state, that is, at the judgment of the smooth road; and a rough road corresponding control section (rough road corresponding control means) 22b configured to perform a shift control according to the rough road at the judgment of the rough road.

As to the hydraulic pressure (the secondary pulley pressure Psec) for adjusting the clamping force by the secondary pulley 3, in the normal state (at the judgment of the smooth surface), the smooth road corresponding control section 22a sets the hydraulic pressure Psec of the secondary pulley 3 to the hydraulic pressure (the corresponding hydraulic pressure) according to the input torque Te from the engine 5. With this, the smooth road corresponding control section 22a controls so that the slippage between the secondary pulley 3 and the V belt 4 is not generated.

Moreover, at the judgment of the rough road, the rough road corresponding control section 22b sets the hydraulic pressure (the secondary pulley pressure Psec) of the secondary pulley 3 to a value higher than the hydraulic pressure (the corresponding hydraulic pressure) according to the input torque Te from the engine 5. The hydraulic pressure Psec of the secondary pulley 3 is set to the higher value at the judgment of the rough road. The driving wheels receive the reaction force torque from the road surface at the rough road judgment. This torque induces the slippage between the secondary pulley 3 and the V belt 4. This is suppressed by increasing the clamping force by increasing the hydraulic pressure Psec.

Besides, the clamping force of the secondary pulley 3 is a sum of the elastic force according to the stroke (movement) of the spring 3d and the secondary pulley pressure Psec. Accordingly, the shift control section 22 calculates the clamping force amount by the hydraulic pressure by subtracting the clamping force amount by the elastic force of the spring 3d from the set damping force. The shift control section 22 calculates the secondary pulley pressure Psec corresponding to the clamping force by the calculated hydraulic pressure. The shift control section 22 mainly controls the pressure decrease valve of the shift control hydraulic pressure circuit 12.

Furthermore, in the normal state (at the judgment of the smooth road) and at the judgment of the rough road, the shift control section 22 sets the hydraulic pressure (the primary pulley pressure Ppri) which is for adjusting the clamping force by the primary pulley 2, to the hydraulic pressure Ppri by which the balance pressure according to the damping force by the secondary pulley 3 can be obtained so that the transmission gear ratio of the continuously variable transmission 1 for the vehicle becomes the target transmission gear ratio. That is, for holding (keeping) the transmission gear ratio, the clamping force of the primary pulley 2 is set so as to attain the ratio (the thrust ratio=the thrust of the primary pulley 2/the thrust of the secondary pulley 3) of the clamping force of the primary pulley 2 to the clamping force of the secondary pulley 3 according to the transmission gear ratio at that time. The hydraulic pressure Ppri is set in accordance with this.

On the other hand, when the transmission gear ratio is shifted to the higher side, the clamping force of the primary pulley 2 is set to a value higher than the balance pressure according to the clamping force of the secondary pulley 3. When the transmission gear ratio is shifted to the lower side, the clamping force of the primary pulley 2 is set to a value lower than the balance pressure according to the clamping force of the secondary pulley 3. The clamping force of the primary pulley 2 corresponds to the primary pulley pressure Ppri. Accordingly, the shift control section 22 calculates the corresponding primary pulley pressure Ppri. The shift control section 22 mainly controls the shift control valve of the shift control hydraulic circuit 12.

The primary rotation control section 23 controls the rotation speed of the primary pulley 2 so that the rotation speed Npri of the primary pulley 2 becomes equal to or greater than a set lower limit rotation speed Npri0 at the satisfaction of a rotation speed control condition. The rotation speed control condition is that the road surface judging section 21 judges that the road surface state is "the rough road". That is, in this embodiment, the rotation speed Npri of the primary pulley 2 is constantly controlled to a value which is equal to or greater than the lower limit rotation speed Npri0 at the judgment of the rough road.

In this way, the rotation speed Npri of the primary pulley 2 is set to a value equal to or greater than the lower limit rotation speed Npri0 at the judgment of the rough road. This reason is described below. At the judgment of the rough road, the rough road corresponding control section 22b of the shift control section 22 increases the clamping force of the secondary pulley 3, that is, the hydraulic pressure of the hydraulic fluid supplied to the secondary pulley 3. Accordingly, it is possible to surely perform this increase of the clamping force by the above-described increase of the rotation speed of the primary pulley 2. When the clamping force of the secondary pulley 3 cannot be surely increased, the oil vibration may be caused. Furthermore, as described above, the transmission gear ratio may be shifted to the side higher than the target transmission gear ratio, so that the control chattering may be caused. The lower limit rotation speed of the primary pulley 2 is set based on the rotation speed by which the oil pump 11 can supply the hydraulic fluid necessary for controlling the transmission gear ratio of the continuously variable transmission to the target transmission gear ratio. With this, it is possible to ensure the discharge amount and the discharge pressure of the hydraulic fluid from the oil pump 11.

Setting the rotation speed Npri of the primary pulley 2 to the value equal to or greater than the lower limit rotation speed Npri0 corresponds to setting the rotation speed Ne of the engine 4 so as not to be decreased. When the rotation speed Ne of the engine 5 is not decreased, the discharge amount and the discharge pressure of the hydraulic fluid of the oil pump 11 driven by the engine 5 is ensured. This control of the rotation speed of the primary pulley 2 is performed by controlling the transmission gear ratio of the CVT 1.

The viscosity of the hydraulic fluid (ATF) is decreased as the oil temperature TMP is increased. The amount of the hydraulic fluid is needed for providing the hydraulic pressure to the primary pulley pressure Ppri and the secondary pulley pressure Psec. In this embodiment, the lower limit rotation speed Npri0 is set based on the oil temperature TMP of the hydraulic fluid. That is, the lower limit rotation speed NPri0 is increased as the oil temperature TMp of the hydraulic fluid is higher, so that the discharge amount of the hydraulic fluid of the oil pump 11 becomes much.

The line pressure control section 24 controls the line pressure $P_L$ which is the base pressure of the primary pulley pressure Ppri and the secondary pulley pressure Psec, through the regulator valve within the shift control hydraulic circuit 12. In the normal state, the line pressure control section 24 sets the line pressure $P_L$ to a value obtained by adding a margin amount to a higher one (necessary pulley pressure) of the set primary pulley pressure Ppri and the set secondary pulley pressure Psec, so as to attain the primary pulley pressure Ppri and the secondary pulley pressure Psec.

Moreover, the line pressure control section 24 gradually decrease the line pressure $P_L$ in a direction to decrease the margin amount when the predetermined conditions in which the variation of the driving state of the vehicle is relatively gentle is satisfied. Finally, the same pressure control by which the line pressure $P_L$ itself is set to the necessary hydraulic pressure is performed. In case where the same pressure control is performed, for example, when the necessary pulley pressure is the primary pulley pressure Ppri, the control is performed so that the line pressure $P_L$ corresponds to the primary pulley pressure Ppri. When the necessary pulley pressure is the secondary pulley pressure Psec, the control is performed so that the line pressure $P_L$ corresponds to the secondary pulley pressure Psec. At the same pressure control, it is possible to suppress the resistance of the fluid passage by fully opening one of the shift control valve and the pressure decrease valve. Accordingly, it is possible to decrease the driving load of the pump of the engine 5, and to improve the fuel economy.

When a line-pressure-up control condition is satisfied at the rough road judgment, the line pressure control section 24 performs a line-pressure-up control to set the line pressure $P_L$ by adding the margin amount which is greater than the margin amount at the normal state (when the line-pressure-up control condition is not satisfied) to the necessary pulley pressure. When the line pressure $P_L$ is low at the rough road judgment, the oil vibration is easy to be caused. Accordingly, the line pressure PL is increased for avoiding or suppressing the oil vibration.

This line-pressure-up control condition is set with respect to the oil temperature TMP inputted from the oil temperature sensor 18, the vehicle speed V based on the rotation speed Nnw of the driven wheels inputted from the driven wheel rotation sensor 19b, and the accelerator pedal operation amount APO inputted from the accelerator operation amount sensor 16, the rotation speed Npri of the primary pulley 2 inputted from the primary pulley rotation sensor 13, and the input torque Te based on the signal (the engine speed Ne, the fuel injection time period, and so on) relating to the inputted torque Te of the engine 5 inputted from the engine ECU 19.

The oil temperature TMP, the vehicle speed V, the accelerator pedal operation amount APO, the primary pulley rotation speed Npri, and the engine input torque Te which relate to the control condition judgment relate to be easy to cause the oil vibration. The oil vibration is easy to be caused as the oil temperature TMP becomes higher. The oil vibration is easy to be caused as the vehicle speed V, the accelerator pedal operation amount APO, the primary pulley rotation speed Npri, and the engine torque Te become smaller or lower. These were understood from the analysis results relating to the generation of the oil vibration.

Accordingly, it is judged whether or not the control condition of the line-pressure-up control is satisfied from the oil temperature TMP, the vehicle speed V, the accelerator pedal opening amount APO, the primary pulley rotation speed Npri, and the engine input torque Te. The line pressure PL is increased in a state where the oil vibration is easy to be caused.

Besides, when the oil temperature TMP is excessively high, another control is needed in consideration of the protection of the hydraulic fluid. The line-pressure-up control is not performed.

For example, FIG. 2 is a map for explaining the judgment conditions relating to the oil temperature TMP, the vehicle speed V, the accelerator pedal operation amount APO, the primary pulley rotation speed Npri, and the engine input torque Te.

As to the oil temperature TMP, as shown in FIG. 2(a), the oil temperature region $TMP_1$ to $TMP_2$ which corresponds to the normal use region of the hydraulic fluid corresponds to a satisfaction region in which the line-pressure-up control is performed.

As to the vehicle speed V and the accelerator opening operation amount APO, as shown in FIG. 2(b), the region from the vehicle speed $V_2$ to $V_3$ and the accelerator operation amount $APO_2$ to $APO_3$ correspond to a satisfaction region in which the line-pressure-up control is performed. The region of the vehicle speed $V_1$ to $V_2$ and $V_3$ to $V_4$, and the region of the accelerator opening amount $APO_1$ to $APO_2$ and $APO_3$ to $APO_4$ correspond to a holding region (Keep region).

As to the primary pulley rotation speed Npri and the engine input torque Te, as shown in FIG. 2(c), the region of the rotation speed $Npri_2$ to $Npri_3$, and the torque $Te_2$ to $Te_3$ correspond to a satisfaction region in which the line-pressure-up control is performed. The region of the rotation speed $Npri_1$ to $Npri_2$ and $Npri_3$ to $Npri_4$, and the torque $Te_1$ to $Te_e$ and $Te_3$ to Te4 correspond to a holding region (Keep region). Besides, in the holding region, when the previous region is the satisfaction region of the line-pressure-up control, the line-pressure-up control is held. In the holding region, when the previous region is the non-satisfaction region, a state where the line-pressure-up control is not performed is held.

Besides, at the stop of the vehicle, the generation of the oil vibration may be caused until the vehicle speed V, the operation amount APO, the rotation speed Npri, and the torque Te become relatively small values. There is no possibility of the generation of the oil vibration at the stop of the vehicle, the release of the accelerator pedal, and so on. Accordingly, it is preferable that the vehicle speed $V_1$, the operation amount $APO_1$, the rotation speed $Npri_1$, and the torque $Te_1$ is set to substantially 0 or an extreme small value which is extremely near 0. In this case, it is judged that the state is the non-satisfaction region when these become 0.

For these judgment, the line pressure control section 24 includes a line-pressure-up control condition judging section 24a. The line-pressure-up control condition judging section 24a judges the states where the oil vibration is easy to be caused, in a two step manner. When one (a part) of the judgment parameters of the oil temperature TMP, the vehicle speed V, the accelerator pedal operation amount APO, the primary pulley rotation speed Npri, and the engine input torque Te becomes the satisfaction region of the line-pressure-up control, it is judged that a condition I (there is small possibility of causing the oil vibration although the generation level is low) is satisfied. In this case, when the line pressure is increased by a first up amount (first increase amount). Moreover, all of the judgment parameters are in the satisfaction region of the line-pressure-up control condition, it is judged that a condition II (there is large possibility of causing the oil vibration) is satisfied. In this case, the line pressure is increased by a second up amount (second increase amount) which is larger than the first up amount.

Moreover, the line pressure control section 24 can perform the smooth line pressure control. At the start of the line-pressure-up control, the line pressure control section 24 increases the line pressure at a limited constant variation rate. Furthermore, at the end of the line-pressure-up control, the line pressure control section 24 decreases the line pressure at a limited constant variation rate.

Furthermore, when the rough road judgment is judged at the same pressure control, the line pressure control section 24 immediately finishes the same pressure control. The line pressure control section 24 sets the line pressure $P_L$ to a value obtained by adding the normal margin amount to the necessary pulley pressure. At this time or thereafter, when the line-pressure-up control condition is satisfied, the line pressure control section 24 sets the line pressure $P_L$ to a value obtained by adding the margin amount larger than the normal margin amount, to the necessary pulley pressure.

[2. Operations and Effects]
[2.1. Summary of Control Process]

The continuously variable transmission for the vehicle and the control device thereof are constructed as described above. Accordingly, the control operations are performed as follows.

Figure 4:
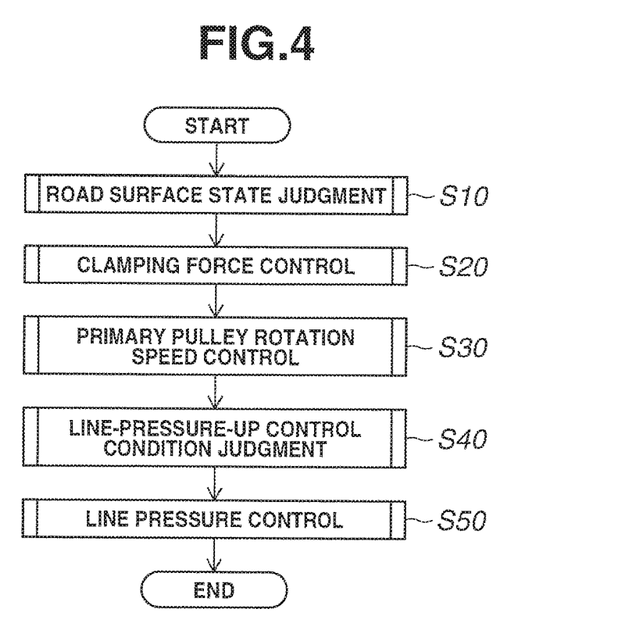
FIG. 4 is a flowchart for illustrating a process of a traveling road judgment, a shift control (clamping force control), a primary pulley rotation speed control, a line-pressure-up control condition judgment, and a line pressure control according to the one embodiment of the present invention.

That is, as shown in FIG. 4, the road surface judging section 21 judges whether the road surface state is "the smooth road" or "the rough road" based on the slippage state of the driving wheel (step S10).

Next, the shift control section 22 controls the primary pulley pressure Ppri and the secondary pulley pressure Psec. With this, the shift control section 22 controls the clamping forces by the primary pulley 2 and the secondary pulley 3 (step S20). Then, when the road surface judging section 21 judges that the road surface state is "the rough road", the primary rotation control section 23 controls the transmission gear ratio so that the rotation speed Npri of the primary pulley 2 becomes equal to or greater than the lower limit rotation speed Npri0 (step S30).

Moreover, the line-pressure-up control condition judging section 24a judges whether or not the line-pressure-up control condition is satisfied based on the judgment parameters of the oil temperature TMP, the vehicle speed V, the accelerator pedal operation amount APO, the primary pulley rotation speed Npri, the engine input torque Te, and so on (step S40). Then, the line pressure control section 24 controls the line pressure $P_L$ in consideration of the judgment result of the line-pressure-up condition judging section 24a (step S50).

[2-2. Each Control Process]

Moreover, each control process is illustrated.

[2-2-1. Road Surface Judgment]

Figure 5:
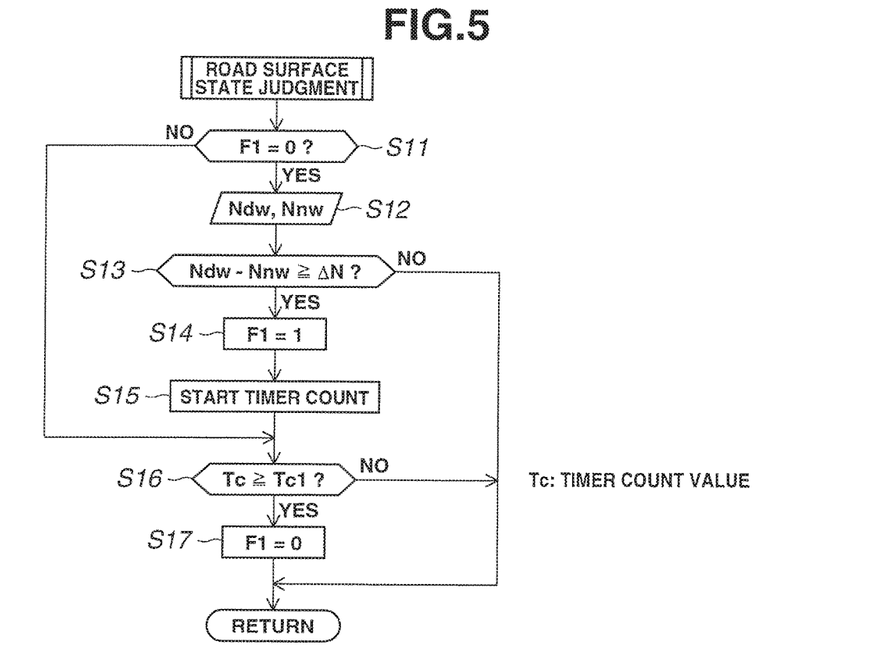
FIG. 5 is a flowchart for illustrating the road surface judgment according to the one embodiment of the present invention.

In the judgment of the road surface state by the road surface judging section 21, first, the road surface judging section 21 judges whether or not the rough road judgment flag (dirt judgment flag) F1 is 0 (step S11), as shown in FIG. 5. When the rough road is judged, the rough road judgment flag F1 is set to 1. When the smooth road is judged, the rough road judgment flag F1 is set to 0.

In this case, when the rough road judgment flag F1 is 0, the rotation speed Ndw of the driving wheels and the rotation speed Nnw of the driven wheels are read (step S12). The deviation (Ndw−Nnw) between the rotation speed Ndw of the driving wheels and the rotation speed Nnw of the driven wheels is compared with the judgment reference value ΔN which is previously set (step S13).

When the deviation (Ndw−Nnw) is equal to or greater than the judgment reference value ΔN, "the rough road" is judged. The rough road judgment flag F1 is set to 1 (step S14). Then, the timer count is started (step S15). The timer count value Tc is compared with the predetermined value Tc1 (step S14). This predetermined value Tc1 corresponds to a predetermined time period during the rough road judgment is held.

When the timer count value Tc becomes equal to or greater than the predetermined value Tc, the rough road judgment flag F1 is reset to 0. Again, the rotation speed Ndw of the driving wheel and the rotation speed Nnw of the driven wheel are read. The road surface state is judged.

[2-2-2. Shift Control by Clamping Force Control (Secondary Pulley)]

Figure 6:
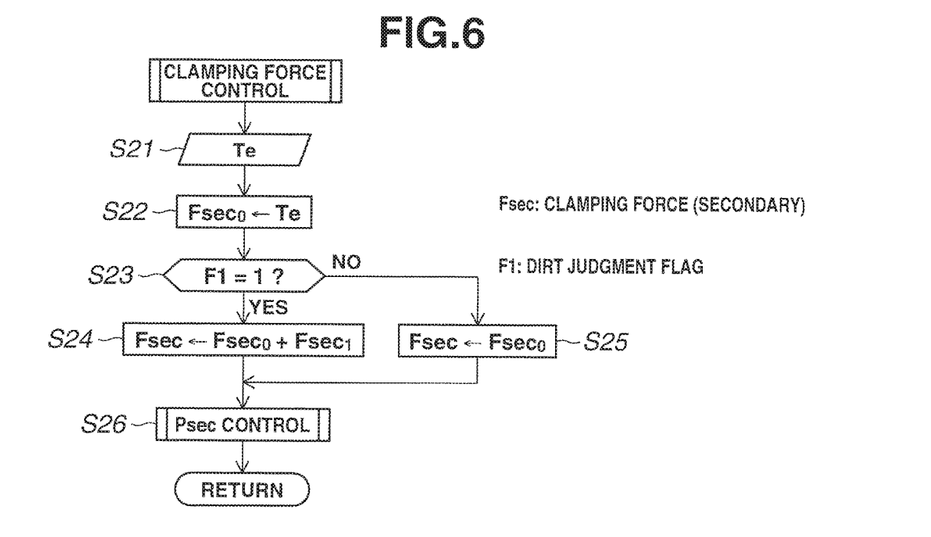
FIG. 6 is a flowchart for illustrating the primary pulley rotation speed control according to the one embodiment of the present invention.

In the clamping force control by the hydraulic pressure control of the secondary pulley 3 relating to the shift control by the shift control section 22, as shown in FIG. 6, the input torque Te from the engine 5 is read (step S21). The clamping force Fsec0 of the secondary pulley 3 is set in accordance with this input torque Te (step S22). It is judged whether or not the rough road judgment flag F1 is 1 (step S23).

When the rough road judgment flag F1 is 1, that is, at the rough road judgment, the clamping force Fsec of the secondary pulley 3 is set to a value obtained by adding the predetermined amount $Fsec_1$ to the clamping force $Fsec_0$ according to the input torque Te (step S24). On the other hand, when the rough road judgment flag F1 is not 1, that is, at the smooth road judgment, the clamping force Fsec of the secondary pulley 3 is set to the clamping force $Fsec_0$ according to the input torque Te (step S25).

Then, the secondary pulley Psec is controlled in accordance with the set clamping force Fsec (step S26).

[2-2-3. Primary Rotation Control]

Figure 7:
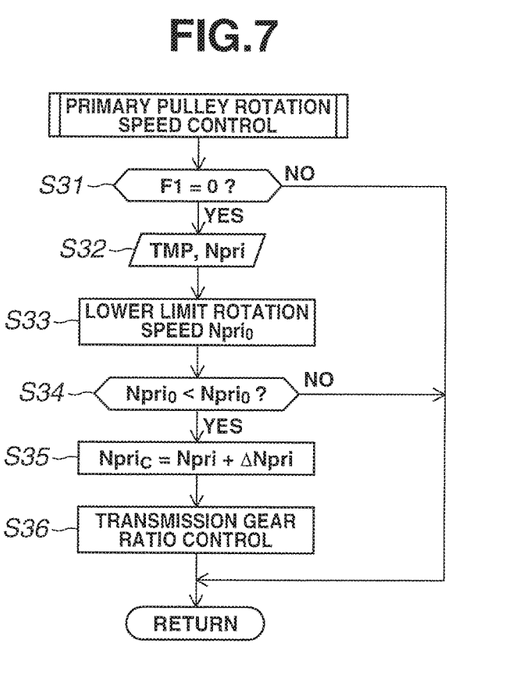
FIG. 7 is a flowchart for illustrating the line-pressure-up control condition judgment according to the one embodiment of the present invention.

In the control of the rotation speed Npri of the primary pulley 2 by the primary rotation control section 23, as shown in FIG. 7, it is judged whether or not the rough road judgment flag F1 is 1 (step S31). When the rough road judgment flag F1 is 1, that is, at the rough road judgment, the oil temperature TMP of the hydraulic fluid and the rotation speed Npri of the primary pulley 2 are read (step S32). The lower limit rotation speed $Npri_0$ is set based on the oil temperature TMP (Step S33).

Then, it is judged whether or not the rotation speed Npri of the primary pulley 2 is lower than the lower limit rotation speed $Npri_0$ (step S34). When the rotation speed Npri is lower than the lower limit rotation speed $Npri_0$, the rotation speed Npri of the primary pulley 2 is increased in a ramp manner so that the rotation speed Npri of the primary pulley 2 reaches the lower limit rotation speed $Npri_0$. That is, a target value Npric of the rotation speed of the primary pulley 2 is set to a value larger than the current value Npri by a predetermined value ΔNpri (step S35). This control of the primary pulley 2 to the rotation speed target value Npric is performed by the control in which the transmission gear ratio is downshifted to the low side (step S36).

[2-2-4. Line-Pressure-Up Control Condition Judgment]

Figure 8:
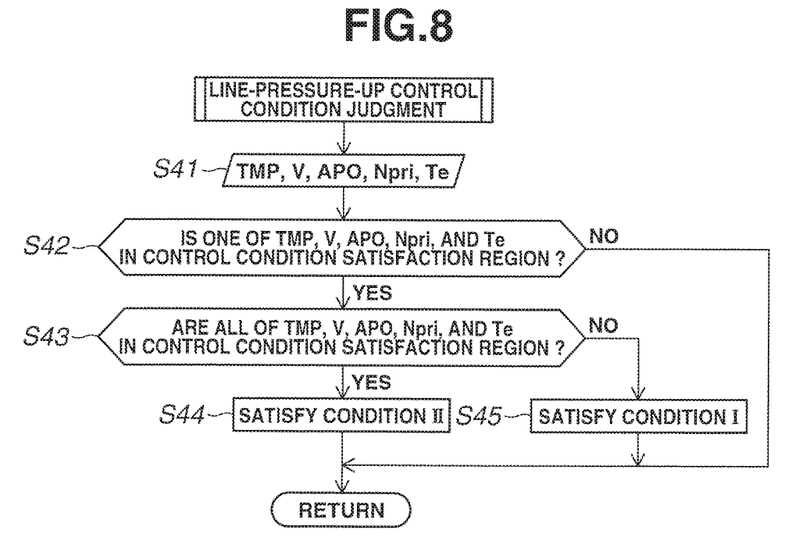
FIG. 8 is a flowchart for illustrating the line pressure control according to the one embodiment of the present invention.

As shown in FIG. 8, the line-pressure-up control condition judging section 24a reads information of the judgment parameters of the oil temperature TMP, the vehicle speed V, the accelerator pedal operation amount APO, the primary pulley rotation speed Npri, and the engine input torque Te (step S41). It is judged whether or not one (part) of the judgment parameters satisfies the control condition of the line-pressure-up control, that is, it is judged whether or not the condition I of the control condition is satisfied (step S42). In a case where this is satisfied, it is judged whether or not all of the judgment parameters satisfy the control conditions of the line-pressure-up control, that is, it is judged whether or not the condition II of the control condition is satisfied (step S43). By these judgments, it is judged whether the condition I of the control condition is satisfied, the condition II of the control condition is satisfied, or none of the condition I and the condition II of the control condition are satisfied.

[2-2-4. Line Pressure Control]

Figure 9:
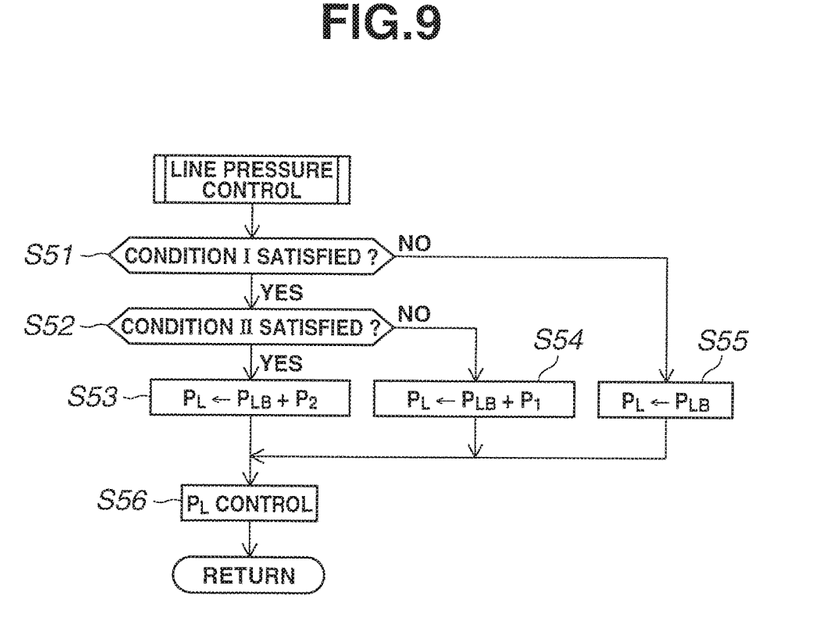
FIG. 9 is a flowchart for illustrating the line pressure control according to the one embodiment of the present invention.

From these judgment results, as shown in FIG. 9, the line pressure control section 24 judges whether or not there is the satisfaction of the condition I, and whether or not there is the satisfaction of the condition II (step S51, S52). When the condition II is satisfied, the target line pressure $P_{LOS2}$ is set to a value ($=P_{LB}+P1$) obtained by adding the second up amount P2 which is the large correction amount, to the reference line pressure $P_{LB}$ so that the line pressure $P_L$ becomes closer to the target value $P_{LOS2}$ (step S53). When the condition I is satisfied, the target line pressure $P_{LOS1}$ is set to a value ($=P_{LB}+P1$) obtained by adding the first up amount P1 which is the small correction amount, to the reference line pressure $P_{LB}$ so that the line pressure $P_L$ is closer to the target value $P_{LOS1}$ (step S54). When neither of the condition I and the condition II is satisfied, the line pressure $P_L$ is set to the reference line pressure LB (step S55).

Then, line pressure $P_L$ control is performed.

[2-3. One Example of Line Pressure Control]

FIG. 3 is a time chart showing one example of the line pressure control. In FIG. 3, F1 is the rough road judgment flag. F2 is the judgment flag of the condition II of the line-pressure-up control condition. Besides, in this example, it is considered that the condition I of the line-pressure-up control condition is satisfied at the same time of the rough road judgment at time t1. Moreover, it is considered that the rough road is judged during the same pressure control.

As shown in the drawing, when the rough road judgment is performed at time $t_1$, the line pressure $P_L$ is increased from the same pressure control value to the reference line pressure $P_{LB}$ by the increase control by the predetermined inclination (cf. symbol R0) as shown by one-dot line, by the end of the same pressure control.

Besides, in this case, the condition I of the line-pressure-up control condition is satisfied at the same time of the judgment of the rough road. Accordingly, the target line pressure $P_{LOS1}$ is set to the value ($=P_{LB}+P1$) obtained by adding the first up amount P1 to the reference line pressure $P_{LB}$. After the line pressure $P_L$ reaches the reference line pressure $P_{LB}$ by the increase control by the predetermined inclination (cf. symbol R0) which is identical to the normal state as shown by a solid line, the inclination is set to gentle inclination (cf. symbol R1). The line pressure is increased to the target line pressure $P_{LOS1}$.

Then, when it is judged that the condition II is satisfied at time t2, the inclination is set to the gentler inclination (cf. symbol R2). The target line pressure $P_{LOS2}$ is set to the value ($P_{LB}+P2$) obtained by adding the second up amount 2 so that the line pressure is increased. When it is judged that the condition II is not satisfied at time $t_3$ (besides, the condition I is satisfied), the line pressure $P_L$ is decreased to the target line pressure $P_{LOS1}$ by the gentle inclination (cf. symbol R3).

Then, when the condition I of the line-pressure-up control condition is not satisfied by the smooth road judgment at time $t_4$, the process returns to the same pressure control. The line pressure PL is decreased to the target value of the same pressure control by the gentle inclination (cf. symbol R4).

In this way, the line pressure $P_L$ is increased or decreased by the gentler manner as the line pressure $P_L$ becomes higher. With this, it is possible to avoid the adverse effect on the hydraulic pressure control using the line pressure $P_L$, due to the variation of the line pressure $P_L$.

[2-4. Effects of the Controls]

By the clamping force control by the shift control section 22, at the smooth road judgment, the clamping force by the secondary pulley 3 is set to the appropriate force according to the input torque Te from the engine 5. With this, the load of the oil pump 11, that is, the engine load is suppressed, and the improvement of the fuel economy of the engine 5 is promoted. On the other hand, at the rough road judgment, the clamping force by the secondary pulley 3 is set to a value higher than the corresponding clamping force according to the input torque Te from the engine 5. Accordingly, even when the driving wheel receives the reaction torque from the road surface, it is possible to avoid the slippage between the secondary pulley 3 and the belt 4.

By the rotation speed control of the primary pulley 2 by the primary pulley rotation control section 23, it is possible to prevent the decrease of the engine speed Ne of the engine 5, and to ensure the discharge amount and the discharge pressure of the hydraulic fluid of the oil pump 11 driven by the engine 5. Consequently, at the rough road judgment, it is possible to surely perform the control by which the hydraulic pressure supplied to the secondary pulley 3 by the shift control section 22 is increased to increase the clamping force. Moreover, it is possible to ensure the hydraulic pressure supplied to the primary pulley 2. Accordingly, it is possible to prevent or suppress the control chattering which is caused by the variation of the transmission gear ratio by losing the thrust force balance, by repeating the return of the transmission gear ratio by the feedback control.

By the line-pressure-up control, in a state where the oil vibration may be caused due to the deficiency of the margin of the line pressure, the line pressure is provided with the margin by the increase of the line pressure. It is possible to surely perform the control to increase the clamping force of the secondary pulley 3 by the shift control section 22. It is possible to prevent or suppress the generation of the oil vibration generated due to the deficiency of the line pressure.

In particular, in this embodiment, the possibility to cause the deficiency of the line pressure is judged by using the judgment parameters of the oil temperature TMP, the vehicle speed V, the accelerator operation amount APO, the primary pulley rotation speed Npri, and the engine input torque Te which relate to the generation of the oil vibration. Accordingly, it is possible to appropriately perform the increase of the line pressure only when the increase of the line pressure is really needed. With this, it is possible to avoid the belt slippage at the rough road while suppressing the deterioration of the fuel economy, and to prevent or suppress the generation of the oil vibration.

Moreover, in this embodiment, it is judged by the two step manner of the condition I in which the possibility to cause the oil vibration and the generation level are relatively low, and the condition II in which the possibility to cause the oil vibration and the generation level are relatively high. The increase of the line pressure is performed in the two step manner according to the above-described two step manner. Accordingly, it is possible to more appropriately perform the increase of the line pressure. Moreover, it is possible to avoid the belt slippage at the traveling at the rough road, and to prevent or suppress the generation of the oil vibration while more surely suppressing the deterioration of the fuel economy.

[3. Others]

Hereinabove, the embodiment according to the present invention are explained. However, the present invention is not limited to the embodiment. The above-described embodiment may be appropriately varied. Moreover, it is optional to employ a part of the embodiment.

For example, in the above-described embodiment, the control to set the rotation speed of the primary pulley to the value equal to or greater than the lower limit value, and the line-pressure-up control are performed together. It is assumed that the generations of the oil vibration and the control chattering can be suppressed only by the control to set the rotation speed of the primary pulley to the value equal to or lower than the lower limit value. It is assumed that the generation of the oil vibration and the control chattering can be suppressed only by the line-pressure-up control. Accordingly, it is effective to perform the single one of these controls.

In the above-described embodiment, as to the line pressure, the same pressure control is performed. However, this same pressure control is optional.

As to the judgment of the road surface state, the method based on the difference of the rotation speeds of the driving wheel and the driven wheel is exemplified. However, it is possible to employ the existing various arts.

Moreover, the V belt 4 is used as the torque transmission member arranged to transmit the torque between the pulleys 2 and 3. However, the torque transmission member is not limited to the belt. A chain and so on may be use as the torque transmission member.

Furthermore, in the above-described embodiment, the engine is exemplified as the power plant. However, the power plant is not limited to this. The power plant may be an electric motor and so on.

The invention claimed is:

1. A control device for a continuously variable transmission of a vehicle, the continuously variable transmission including a primary pulley connected to an output shaft side of a power plant, a secondary pulley connected to a driving wheel side, an oil pump arranged to be driven by the power plant, and to supply a hydraulic fluid to the pulleys, and a circular belt member wound around the pulleys, the control device comprising:
 a transmission control unit configured to
 control a hydraulic pressure of the hydraulic fluid supplied to the pulleys in accordance with a traveling state of the vehicle, and thereby to control a transmission gear ratio of the continuously variable transmission;
 control a line pressure which is a base pressure of the hydraulic pressure; and
 judge whether a state of a road surface on which the vehicle travels is a smooth road or a rough road,
 when the road is judged to be rough, perform a rough road corresponding control to increase the hydraulic pressure to a value larger than the hydraulic pressure when the road is judged to be smooth, and
 when a line-pressure-up control condition is satisfied at the rough road judgment, increase the line pressure to be greater than the line pressure when the line-pressure-up control condition is not satisfied.

2. The control device for the continuously variable transmission of the vehicle as claimed in claim 1, wherein the line-pressure-up control condition includes a condition in which an input torque from the power plant to the primary pulley is equal to or greater than a predetermined torque.

3. The control device for the continuously variable transmission of the vehicle as claimed in claim 1, wherein the line-pressure-up control condition includes a condition in which a rotation speed of the primary pulley is equal to or smaller than a predetermined rotation speed.

4. The control device for the continuously variable transmission of the vehicle as claimed in claim 1, wherein the line-pressure-up control condition includes a condition in which an accelerator opening degree of the vehicle is equal to or smaller than a predetermined opening degree.

5. The control device for the continuously variable transmission of the vehicle as claimed in claim 1, wherein the line-pressure-up control condition includes a condition in which a vehicle speed of the vehicle is equal to or smaller than a predetermined vehicle speed.

6. The control device for the continuously variable transmission of the vehicle as claimed in claim 1, wherein the line-pressure-up control condition includes a condition in which an oil temperature of the hydraulic fluid is equal to or greater than a predetermined temperature.

7. The control device for the continuously variable transmission of the vehicle as claimed in claim 1, wherein the transmission control unit is configured to perform a rotation speed control so that the rotation speed of the primary pulley becomes equal to or greater than a set lower limit rotation speed when a rotation speed control condition is satisfied at the rough road judgment.

8. The control device for the continuously variable transmission of the vehicle as claimed in claim 7, wherein the transmission control unit is configured to control the transmission gear ratio when the rotation speed of the primary pulley is lower than the lower limit rotation speed when the rotation speed control condition is satisfied, and thereby to increase the rotation speed of the primary pulley, and to control the transmission gear ratio when the rotation speed of the primary pulley reaches the lower limit rotation speed, and thereby to hold the rotation speed of the primary pulley so that the rotation speed of the primary pulley is equal to or greater than the lower limit rotation speed.

9. The control device for the continuously variable transmission of the vehicle as claimed in claim 7, wherein the lower limit rotation speed is set based on the rotation speed by which the oil pump is capable of supplying the hydraulic pressure necessary for controlling the transmission gear ratio of the continuously variable transmission for the vehicle to a target transmission gear ratio.

10. The control device for the continuously variable transmission of the vehicle as claimed in claim 7, wherein the lower limit rotation speed is set to a higher speed side as a temperature of the hydraulic fluid is higher.

11. The control device for the continuously variable transmission of the vehicle as claimed in claim 1, wherein the transmission control unit is configured to
    perform, at the smooth road judgment, a smooth road corresponding control to control the hydraulic fluid supplied to the secondary pulley to a corresponding hydraulic pressure according to an output torque from the power plant;
    perform, at the rough judgment, the rough road corresponding control to increase a clamping force by the secondary pulley to be greater than the corresponding hydraulic pressure; and
    control the hydraulic pressure of the primary pulley to a balance pressure according to the hydraulic pressure of the secondary pulley at both of the smooth road corresponding control and the rough road corresponding control so that the transmission gear ratio of the continuously variable transmission of the vehicle becomes a target transmission gear ratio.

* * * * *